United States Patent [19]

Sado et al.

[11] Patent Number: 4,788,098
[45] Date of Patent: Nov. 29, 1988

[54] AROMATIC POLYIMIDE LAMINATE SHEET

[75] Inventors: Takahiko Sado; Hiroaki Mori, both of Tokyo, Japan

[73] Assignee: Ube Industries, Inc., Ube, Japan

[21] Appl. No.: 941,432

[22] Filed: Dec. 15, 1986

[30] Foreign Application Priority Data

Dec. 17, 1985 [JP] Japan .................................. 60-281957

[51] Int. Cl.$^4$ ........................ B32B 7/02; B32B 27/08
[52] U.S. Cl. ................................. 428/215; 156/308.2; 428/220; 428/473.5
[58] Field of Search ..................... 428/458, 473.5, 220, 428/215; 156/308.2

[56] References Cited

U.S. PATENT DOCUMENTS 4,543,295  9/1985  St Clair et al. ...................... 428/458

Primary Examiner—Thomas J. Herbert
Attorney, Agent, or Firm—Finnegan, Henderson, Farabow, Garrett & Dunner

[57] ABSTRACT

An aromatic polyimide laminate sheet having a relatively large thickness of 50 μm or more comprises (1) at least one first film layer comprising a polymerization-imidization product of an acid component containing 80 to 100 molar % of at least one biphenyltetracarboxylic acid with an amine component containing 80 to 100 molar % of at least one aromatic diamine having two or more benzene rings, and having a glass transition point of 250° C. to 350° C.; and (2) at least one second film layer comprising an aromatic imide polymer, the first and second film layers being alternately laminated on and directly bonded to each other without using bonding material.

14 Claims, No Drawings

AROMATIC POLYIMIDE LAMINATE SHEET

BACKGROUND OF THE INVENTION

1. Field of the Invention

The present invention relates to an aromatic polyimide laminate sheet and a process for producing the same. More particularly, the present invention relates to an aromatic polyimide laminate sheet having a desired relatively large thickness of 50 μm or more, which thickness is difficult to obtain by a usual dope solution-spreading method, and consisting of one or more types of aromatic imide polymers alone having an excellent heat resistance, durability, flexibility and bonding property, and thus useful for various uses, and a process for producing the same easily and with an improved reproductivity.

2 Description of the Related Art

It is known that a conventional aromatic imide polymer film having a thickness of from about 10 to 130 μm is produced by preparing a dope solution of an aromatic imide polymer or a precursory polymer of the imide polymer in an organic solvent, by spreading the dope solution on a substrate surface to form a thin layer of the dope solution, and by solidifying the dope solution layer to provide a thin sheet. However, the conventional dope solution-spreading method is disadvantageous in that the polymer has a poor solubility in an organic solvent, the resultant dope solution has a high viscosity, and therefore, the film-formation can be effected only by a difficult operation and under restricted conditions.

Accordingly, in the conventional method, it is very difficult to produce a sheet having a relatively large thickness of, for example, 50 μm or more, with satisfactory quality and at high reproductivity.

Also, it is known that almost all aromatic imide polymers are non-fusible. Therefore, it is believed that a direct bonding of the conventional aromatic imide polymer films to each other without applying a bonding material, for example, a bonding agent or a bonding film, e.g., a fluorine-containing thermoplastic resin film, is very difficult.

Even if the aromatic imide polymer films can be bonded to each other with a bonding material, the resultant laminate sheet contains a bonding material layer which usually has a poorer heat resistance and durability than those of the aromatic imide polymer film, and thus exhibits, as a whole, a decreased heat resistance and durability.

Accordingly, there is a strong demand for the provision of an aromatic imide polymer sheet having a relatively large thickness of 50 μm or more and free from a bonding material, and a process for producing the same at a satisfactory reproductivity and efficiency.

SUMMARY OF THE INVENTION

An object of the present invention is to provide an aromatic polyimide laminate sheet having a thickness of 50 μm or more and free from a bonding material, and a process for producing the same with satisfactory efficiency and reproductivity by an easy operation.

The above-mentioned object is attained by the aromatic polyimide laminate sheet and the process of the present invention.

The aromatic polyimide laminate sheet of the present invention has a thickness of 50 μm or more and comprises (1) at least one first film layer comprising an aromatic imide polymer consisting essentially of a polymerization-imidization product of an aromatic tetracarboxylic acid component containing 80 to 100 molar % of a principal acid ingredient consisting of at least one biphenyltetracarboxylic acid compound with an aromatic diamine component containing 80 to 100 molar % of a principal diamine ingredient consisting of at least one aromatic diamine compound having two or more benzene rings, the aromatic imide polymer having a glass transition temperature of from 250° C. to 350° C.; and (2) at least one second film layer comprising an aromatic imide polymer, the at least one first film and the at least one second film being alternately laminated on and directly heat-press bonded to each other without arranging a bonding material layer therebetween in any way. The process of the present invention for producing an aromatic polyimide laminate sheet having a thickness of 50 μm or more comprises the step of (1) alternately superimposing at least one first film comprising an aromatic imide polymer consisting essentially of a polymerization-imidization product of an aromatic tetracarboxylic acid component containing 80 to 100 molar % of a principal acid ingredient consisting of at least one biphenyltetracarboxylic acid compound with an aromatic diamine component containing 80 to 100 molar % of a principal diamine ingredient consisting of at least one aromatic diamine compound having two or more benzene rings, the aromatic imide polymer having a glass transition temperature of from 250° C. to 350° C.; and at least one film comprising an aromatic imide polymer, to provide a precursory laminate sheet; and (2) heat-pressing the precursory laminate sheet at a temperature of 10° C. to 200° C. above the glass transition temperature of the aromatic imide polymer of the first film, to directly bond the first and second films to each other without arranging a bonding material therebetween in any way.

DESCRIPTION OF THE PREFERRED EMBODIMENT

The aromatic polyimide laminate sheet of the present invention has a relatively large thickness of 50 μm or more and comprises at least one specific first film layer and at least one second film layer.

The specific first film layer comprises an aromatic imide polymer consisting essentially of a polymerization-imidization product of an aromatic tetracarboxylic acid component which contains 80 to 100 molar %, preferably 90 to 100 molar %, of a principal acid ingredient consisting of at least one biphenyltetracarboxylic acid compound with an aromatic diamine component containing 80 to 100 molar %, preferably 90 to 100 molar %, of a principal diamine ingredient consisting of at least one aromatic diamine compound having two or more benzene rings.

The principal acid ingredient in the aromatic tetracarboxylic acid component consists of at least one member selected from biphenyltetracarboxylic acid compounds, for example, 3,3',4,4'-biphenyltetracarboxylic acid, 2,3,3',4'-biphenyltetracarboxylic acid, and dianhydrides and lower alkyl esters of the above-mentioned acids. The principal acid ingredient preferably consists of 3,3',4,4'-biphenyltetracarboxylic dianhydride (s-BPDA) alone, 2,3,3',4'-biphenyltetracarboxylic dianhydride (a-BPDA) alone, or a mixture of s-BPDA and a-BPDA, more preferably s-BPDA alone or a mixture of 80 molar % or more of s-BPDA and 20 molar % or less of a-BPDA, which effectively causes the resultant aromatic polyimide laminate sheet to exhibit an excellent heat resistance, mechanical strength, and bonding property.

The aromatic tetracarboxylic acid component usable for the first film layer may contain, in addition to the principal acid ingredient, 20 molar % or less, preferably 10 molar % or less, or an additional acid ingredient consisting of at least one aromatic tetracarboxylic acid compound other than the biphenyltetracarboxylic acid compounds. The other aromatic tetracarboxylic acid compound in the additional acid ingredient is preferably selected from pyromellitic acid, benzophenone tetracarboxylic acids, for example, 3,3',4,4'-benzophenone tetracarboxylic acid and 2,3,3',4'-benzophenone tetracarboxylic acid, 2,2-bis(3,4-dicarboxyphenyl)propane, bis(3,4-dicarboxyphenyl)methane, bis(3,4-dicarboxyphenyl)phosphine, and dianhydrides and lower alkyl esters of the above-mentioned acids.

If the content of the specific principal acid ingredient in the aromatic tetracarboxylic acid component is less than 80 molar %, the resultant first film layer will exhibit an unsatisfactory bonding property to the second film layer.

The principal diamine ingredient in the aromatic diamine component consists of at least one aromatic diamine compound having two or more benzene rings. The aromatic diamine compound having plural benzene rings is preferably selected from diaminodiphenylethers, for example, 4,4'-diaminodiphenylether, 3,3'-diaminodiphenylether, 3,3'-dimethyl-4,4'-diaminodiphenylether, and 3,3'-methoxy-4,4'-diaminodiphenylether; diaminodiphenylthioethers, for example, 4,4'-diaminodiphenylthioether and 3,3'-diaminodiphenylthioether; diaminobenzophenones, for example, 4,4'-diaminobenzophenone and 3,3'-diaminobenzophenone; diaminodiphenylphosphines, for example, 4,4'-diaminodiphenylphosphine and 3,3'-diaminodiphenylphosphine; and diaminodiphenylmethanes, for example, 4,4'-diaminodiphenylmethane and 3,3'-diaminodiphenylmethane.

Preferably, the principal diamine ingredient for the first film layer consists of 4,4'-diaminodiphenylether alone, 3,3'-diaminodiphenylether alone, or a mixture of 60 molar % or more, more preferably, 80 molar % or more, of at least one diaminodiphenylether and the balance consisting of at least one aromatic diamine compound having two or more benzene rings other than the diaminodiphenylethers.

The aromatic diamine component for the aromatic imide polymer for the first film layer may contain, in addition to the principal diamine ingredient, 20 molar % or less, preferably 10 molar % or less of an additional diamine ingredient consisting of at least one aromatic diamine compound other than that contained in the principal diamine ingredient. For example, the additional diamine ingredient consists of at least one aromatic diamine having a single benzene ring selected, for example, from ortho, meta, and paraphenylene diamines.

The aromatic imide polymer for the first film layer consists essentially of a polymerization-imidization product of the above-mentioned specific aromatic tetracarboxylic acid component with the above-mentioned specific aromatic diamine component.

For example, the aromatic tetracarboxylic acid component and the aromatic diamine component are polymerized in an organic polar solvent at a polymerization temperature of 100° C. or less, preferably 60° C. or less, to provide a polyamic acid dissolved in the organic polar solvent.

The resultant polyamic acid solution can be used as a dope solution for producing the first film layer. Namely, the dope solution is spread on a substrate surface to form a thin layer of the dope solution. The thin dope solution layer is solidified by evaporating the solvent from the thin layer. During or after the evaporation procedure, the polyamic acid in the thin layer is imidized at a temperature of from 100° C. to 500° C., preferably 150° C. to 450° C., to provide a first film.

Alternatively, the polyamic acid or a solution thereof is heated at a temperature of 150° C. to 300° C. in the absence of a catalyst, or at a temperature of 150° C. or less in the presence of an imidization catalyst containing, for example, pyridine, acetic anhydride or a mixture thereof.

The resultant aromatic imide polymer is dissolved in an organic polar solvent consisting of a phenol compound, to provide a dope solution. A thin layer of the dope solution is formed on a substrate surface and is solidified by evaporating the solvent from the thin layer to form a first film.

In another method, the aromatic tetracarboxylic acid component and the aromatic diamine component for the aromatic imide polymer for the first film layer are dissolved in a phenol solvent consisting of at least one phenolic compound, selected from, for example, phenol, cresol, monohalogenated phenols, and monohalogenated cresols, and are polymerized and imidized at a temperature of from 150° C. to 300° C. with a one-step reaction.

The resultant aromatic imide polymer dope solution is formed into a thin layer thereof on a surface of a substrate, and then the thin dope solution layer is converted to a first film in the same manner as mentioned above.

Preferably, the resultant aromatic imide polymer has a degree of imidization of 90% or more and a logarithmic viscosity number of 0.2 to 7.0, more preferably, 0.3 to 5.0, determined at a concentration of 0.5 g/100 ml in p-chlorophenol at a temperature of 50° C.

The resultant aromatic imide polymer in the first film layer must exhibit a glass transition point (secondary transition temperature) of from 250° C. to 350° C., preferably from 260° C. to 340° C.

The glass transition temperature is determined by a dynamic viscoelastometric-measurement method, for example, by using a mechanical spectrometer made by Reometric Co.

If the glass transition temperature of the aromatic imide polymer is more than 350° C., the resultant first film will exhibit a decreased bonding property, and therefore, the resultant laminate sheet will exhibit an unsatisfactory bonding strength.

In the laminate sheet of the present invention, the second film layer is preferably the same as the first film layer. That is, the second film layer preferably consists of the same type of aromatic imide polymer as that of the first film layer and has the same thickness as that of the first film layer. Also, the second film layer may consist of the same type of aromatic imide polymer as that of the first film layer and may have a different thickness from that of the first film layer. Furthermore, the second film layer may have a different type of aromatic imide polymer and/or thickness from that of the first film layer.

The second film layer in the laminate sheet of the present invention may consist of an aromatic imide polymer which is different from that of the first film layer and which is a polymerization-imidization product of an aromatic tetracarboxylic acid component consisting of at least one aromatic tetracarboxylic acid selected from, for example, biphenyltetracarboxylic acids, benzophenone tetracarboxylic acids, pyromellitic acid, and dianhydrides and lower alkyl esters of the above-mentioned tetracarboxylic acids, with an aromatic diamine component consisting of at least one aromatic diamine selected from, for example, diaminodiphenylethers, diaminodiphenylthioethers, diaminobenzophenones, diaminodiphenylmethanes, and ortho, meta, and paraphenylene diamines.

Preferably, the second film layer consists of a polymerization-imidization product of biphenyltetracarboxylic dianhydride with p-phenylene diamine or of at least one member selected from aromatic tetracarboxylic dianhydrides different from biphenyltetracarboxylic dianhydrides, for example, benzophenone tetracarboxylic dianhydrides and pyromellitic dianhydride with an aromatic diamine, for example, p-phenylene diamine or 4,4'-diaminodiphenylether.

Preferably, the first and second film layers have, independently from each other, a thickness of from 10 to 200 $\mu$m, more preferably from 20 to 150 $\mu$m.

When the first and second films are prepared by a conventional dope solution-spreading method, the thickness as mentioned above causes the process for producing the film in an industrial scale to be stabilized and the resultant films to exhibit an excellent quality.

The laminate sheet of the present invention is composed of at least one first film layer and at least one second film layer which are superimposed alternately on and heat-press-bonded to each other.

Also, the laminate sheet of the present invention may be composed of a plurality of unit laminates each consisting of a first film and a second film heat-press-bonded to each other. The plural unit laminates are superimposed on and heat-press-bonded to each other to form a body of a laminate sheet having a desired thickness.

The laminate sheet of the present invention has a thickness of 50 $\mu$m or more, preferably 100 to 5000 $\mu$m, more preferably 150 to 3000 $\mu$m, which thickness allows the resultant laminate sheet to be easily produced and to exhibit a satisfactory flexibility or deformability and a low stiffness.

The specific first film layer in the laminate sheet of the present invention exhibits a high heat-press-bonding property to resinous articles, metallic articles, for example, steel foil and copper foil, and inorganic material articles, for example, semiconductor membranes and ceramic membranes.

Accordingly, the laminate sheet of the present invention is useful as a covering sheet material for the above-mentioned resinous articles, metallic articles, and inorganic material articles, by heat-press-bonding the first film layer of the laminate sheet of the present invention.

In the process of the present invention for producing an aromatic polyimide laminate sheet having a thickness of 50 $\mu$m or more, the afore-mentioned first film or films and second film or films are alternately superimposed on each other without arranging a bonding material layer therebetween to provide a precursory laminate sheet, and the precursory laminate sheet is heat-pressed at a temperature of 10° C. to 200° C., preferably 20° C. to 150° C., above the glass transition temperature of the aromatic imide polymer in the first film, to directly bond the first film to the second film without using a bonding material in any way.

The heat-press-bonding temperature is lower than the melting points or thermal decomposition temperatures of the first and second films.

If the heat-press-bonding temperature is lower than 10° C. above the glass transition temperature of the first film, the first film will not exhibit a satisfactory bonding property to the second film, and the bonding strength of the first film to the second film will be unsatisfactory.

If the heat-press-bonding temperature is higher than 200° C. above the glass transition temperature of the first film, the laminate sheet will be heat decomposed or deteriorated and the resultant decomposition gas will cause voids or pores in the laminate sheet.

Preferably, 1 to 5 pieces of the first film are alternately superimposed on and directly bonded to 1 to 5 pieces of the second film.

The heat-press-bonding operation is preferably carried out at the above-described temperature under a pressure of 1 to 2,000 kg/cm$^2$, more preferably 5 to 500 kg/cm$^2$, still more preferably 10 to 200 kg/cm$^2$, for 0.1 second to 2 hours, more preferably 30 seconds to 1 hour, still more preferably 1 to 10 minutes.

In the process of the present invention, the first and second films may be preliminarily heated to an elevated temperature which is close to the bonding temperature, before the superimposing procedure. The pre-heated first and second films are continuously superimposed on and simultaneously heat-press-bonded to each other by means of a pair of heat-pressing rolls.

The heat-press-bonding procedure may be effected by means of a heat-presser.

In the production of the laminate sheet of the present invention, preferably the first film is the same in at least the type of the aromatic imide polymer as the second film.

The laminate sheet of the pesent invention contains, as an essential film layer, at least one first film layer comprising a specific aromatic imide polymer containing a biphenyltetracarboxylic acid compound as an essential acid component, and having a glass transition point of from 250° C. to 350° C.

The specific first film exhibits an excellent heat-press-bonding property to a second film comprising an aromatic imide polymer which is the same as or different from the aromatic imide polymer of the first film. Accordingly, the specific first film can be directly bonded to the second film without using any bonding material, to provide a laminate sheet having a relatively large thickness of 50 $\mu$m or more and exhibiting excellent heat resistance, moisture resistance, and mechanical strength.

The laminate sheet of the present invention exhibits an excellent heat resistance, chemical resistance, and moisture resistance, which are remarkably higher than those of conventional laminate sheets consisting of two or more aromatic imide polymer films bonded to each other through a bonding material layer, and which are similar to or higher than those of a conventional aromatic imide polymer sheet consisting of a single film having a relatively large thickness.

In the laminate sheet of the present invention, the first film layer exhibits a satisfactory heat-press-bonding property to other articles, for example, inorganic articles such as glass articles and ceramic articles, and metallic articles such as aluminum foil, copper foil, and steel sheeting. Accordingly, the laminate sheet of the present invention can be firmly bonded to the inorganic articles or metallic articles through the first film layer without using bonding material.

The above-mentioned specific laminate sheet having a desired large thickness can be produced by the process of the present invention in a simple and easy manner and at a reduced cost.

The present invention will be further explained by way of specific examples, which, however, are merely representative and do not restrict the scope of the present invention in any way.

EXAMPLE 1

An aromatic imide polymer was prepared by polymerizing equimolar amounts of 3,3',4,4'-biphenyltetracarboxylic dianhydride (s-BPDA) and 4,4'-diaminodiphenylether (DADE) in a solvent consisting of p-chlorophenol, and then imidizing the resultant polymerization product. The resultant imide polymer had a logarithmic viscosity number of 3.2 and a glass transition temperature of 285° C.

The aromatic imide polymer was dissolved in a concentration of 15 g/100 ml in a solvent consisting of p-chlorophenol at a temperature of 100° C.

The aromatic imide polymer dope solution was converted to an aromatic imide polymer film having a thickness of 125 μm by an ordinary dope solution-spreading method, and three pieces of the aromatic imide polymer film were superimposed on each other. The resultant precursory laminate sheet was heat-pressed at a temperature of 350° C. under a pressure of 35 kg/cm$^2$ for 5 minutes by means of a heat plate presser to directly bond the films to each other.

The resultant laminate sheet had a thickness of 365 μm and exhibited a resistance to peeling at an angle of 180 degrees of 1.7 kg/cm.

EXAMPLE 2

The same procedures as those described in Example 1 were carried out with the following exception.

The thickness of each aromatic imide polymer film was 50 μm, and the heat-pressing operation was effected at a temperature of 350° C. under a pressure of 30 kg/cm$^2$ for 5 minutes.

The resultant laminate sheet had a thickness of 145 μm and exhibited a resistance to peeling at an angle of 180 degrees of 2.1 kg/cm.

EXAMPLE 3

The same procedures as those described in Example 1 were carried out with the following exception.

Two pieces of the aromatic imide polymer film were converted to a laminate sheet, and the heat-pressing operation was carried out at a temperature of 330° C. under a pressure of 40 kg/cm$^2$ for 3 minutes.

The resultant laminate sheet had a thickness of 245 μm and exhibited a resistance to peeling at an angle of 100 degrees of 1.9 kg/cm.

COMPARATIVE EXAMPLE 1

The same procedures as those described in Example 3 were carried out with the following exception.

Pyromellitic dianhydride was used in place of 3,3',4,4'-biphenyltetracarboxylic dianhydride, and the resultant comparative aromatic imide polymer did not exhibit a glass transition point.

Two pieces of the resultant comparative imide polymer film were directly superimposed on and heat-press-bonded to each other at a temperature of 450° C. under a pressure of 35 kg/cm$^2$ for 5 minutes.

The resultant comparative laminate sheet had a thickness of 245 μm and exhibited an extremely poor resistance to peeling at an angle of 180 degrees of 0.1 kg/cm.

EXAMPLE 4

The same procedures as those described in Example 1 were carried out except that five pieces of the aromatic imide polymer film were superimposed on and heat-pressbonded to each other without using bonding material at a temperature of 330° C. and under a pressure of 45 kg/cm$^2$ for 3 minutes.

The resultant laminate sheet had a thickness of 605 μm and exhibited a resistance to peeling at an angle of 180 degree of 1.0 kg/cm$^2$ or more, a tensile strength of 20 kg/mm$^2$, an ultimate elongation of 110% and a tensile elastic modulus of 300 kg/mm$^2$.

COMPARATIVE EXAMPLE 2

The same procedures as those described in Example 4 were carried out except that a surface of each of the five pieces of the aromatic imide polymer film was coated with a fluorinated ethylene-propylene copolymer (FEP) resin to a thickness of 12.5 μm, and the five coated film pieces were superimposed on and heat-press-bonded to each other through the fluorine-containing resin coating layers.

The resultant comparative laminate sheet had a thickness of 675 μm and exhibited a poor resistance to peeling at an peeling angle of 180 degrees of 0.4 kg/cm.

It was found that a heat-pressing temperature of 200° C. or more causes the FEP resin-coated film pieces to exhibit substantially no bonding property.

EXAMPLE 5

The same procedures as those described in Example 1 were carried out with the following exception.

A film (A) having a thickness of 125 μm was prepared from an aromatic imide polymer which was produced from s-BPDA and p-phenylene diamine and which exhibited substantially no glass transition point.

A film (B) having a thickness of 25 μm was prepared from the same aromatic imide polymer as that described in Example 1.

A piece of the film (B) was interposed between two pieces of the film (A).

The resultant precursory three-film laminate sheet (A-B-A) was heat-pressed at a temperature of 350° C. under a pressure of 40 kg/cm$^2$ for 3 minutes.

The resultant laminate sheet exhibited a thickness of 275 μm and exhibited a resistance to peeling at an angle of 180 degrees of 1.2 kg/cm.

EXAMPLE 6

The same procedures as those described in Example 5 were carried out with the following exception.

Two pieces of the film (B) were interposed between three pieces of the film (A) in the sequence of A-B-A-B-A, and the resultant precursory five films laminate sheet (A-B-A-B-A) was heat pressed at a temperature of 350° C. under a pressure of 40 kg/cm$^2$ for 5 minutes.

The resultant laminate sheet had a thickness of 425 μm and exhibited a resistance to peeling at an angle of 180 degrees of 1.0 kg/cm.

EXAMPLE 7

The same procedures as those described in Example 5 were carried out with the following exception.

Two pieces of the film (A) and two pieces of the film (B) were superimposed on each other in the sequence A-B-A-B, and a heat-pressing procedure was applied to the resultant precursory laminate sheet (A-B-A-B) at a temperature of 350° C. under a pressure of 40 kg/cm$^2$ for 3 minutes.

The resultant laminate sheet had a thickness of 300 μm and exhibited a resistance to peeling at an angle of 180 degrees of 1.1 kg/cm.

We claim:

1. An aromatic polyimide laminate sheet having a thickness of 50 μm or more and comprising:
   (1) at least one first film layer comprising an aromatic imide polymer consisting essentially of a polymerization-imidization product of an aromatic tetracarboxylic acid component containing 80 to 100 molar % of a principal acid ingredient consisting of at least one biphenyltetracarboxylic acid compound with an aromatic diamine component containing 80 to 100 molar % of a principal diamine ingredient consisting of at least one aromatic diamine compound having two or more benzene rings, and having a glass transition temperature of from 250° C. to 350° C.; and
   (2) at least one second film layer comprising an aromatic imide polymer,
   the at least one first film layer and the at least one second film layer being alternately laminated on and directly heat-press-bonded to each other without in any way arranging a bonding material layer therebetween.

2. The laminate sheet as claimed in claim 1, wherein the biphenyltetracarboxylic acid compound is selected from the group consisting of 3,3',4,4'-biphenyltetracarboxylic acid, 2,3,3',4'-biphenyltetracarboxylic acid and dianhydrides and lower alkyl esters of the above-mentioned acids.

3. The laminate sheet as claimed in claim 1, wherein the aromatic tetracarboxylic acid component contains, in addition to the principal acid ingredient, 20 molar % or less of an additional ingredient consisting of at least one member selected from the group consisting of pyromellitic acid, benzophenone tetracarboxylic acids, 2,2-bis(3,4-dicarboxyphenyl)propane, bis(3,4-dicarboxyphenyl)methane, bis(3,4-dicarboxyphenyl)phosphine and dianhydrides and lower alkyl esters of the above-mentioned acids.

4. The laminate sheet as claimed in claim 1, wherein the aromatic diamine compound having two or more benzene rings is selected from the group consisting of diaminodiphenylethers, dialkyl-diaminodiphenylethers, dialkoxydiaminodiphenylethers, diaminodiphenylthioethers, diaminobenzophenones, diaminodiphenylphosphines, and diaminodiphenylmethanes.

5. The laminate sheet as claimed in claim 1, wherein the principal diamine ingredient contains at least 60 molar % of at least one member selected from diaminodiphenylethers, dialkyl-diaminodiphenylethers and dialkoxydiaminodiphenylethers.

6. The laminate sheet as claimed in claim 1, wherein the aromatic diamine component contains, in addition to the principal diamine ingredient, 20 molar % or less of an additional diamine ingredient consisting of at least one aromatic diamine having a single benzene ring.

7. The laminate sheet as claimed in claim 1, wherein the aromatic imide polymer of the first film layer has a logarithmic viscosity number of 0.2 to 7.0, determined at a concentration of 0.5 g/100 m in a solvent consisting of p-chlorophenol at a temperature of 50° C.

8. The laminate sheet as claimed in claim 1, wherein the second film layer is the same as the first film layer.

9. The laminate sheet as claimed in claim 1, wherein the aromatic imide polymer of the second film layer is the same as that of the first film layer.

10. The laminate sheet as claimed in claim 1, wherein the second sheet layer is different from the first film layer.

11. The laminate sheet as claimed in claim 1, wherein the aromatic imide polymer of the second film layer is different from that of the first film layer.

12. The laminate sheet as claimed in claim 1, wherein the first and second film layers respectively have, independently from each other, a thickness of 10 to 200 μm.

13. The laminate sheet as claimed in claim 1, which has a thickness of 100 to 2000 μm.

14. The laminate sheet as claimed in claim 1, wherein the second film layer comprises an aromatic imide polymer consisting essentially of a polymerization-imidization product of an aromatic carboxylic acid component consisting of at least one member selected from aromatic biphenyltetracarboxylic acids and dianhydrides and lower alkyl esters of the above-mentioned acids, with an aromatic diamine component consisting of at least one aromatic diamine.

* * * * *